US012623807B2

(12) United States Patent
Van Nortwick et al.

(10) Patent No.: US 12,623,807 B2
(45) Date of Patent: May 12, 2026

(54) METHOD OF FORMING A CONTAINER HAVING A ROLLED RIM

(71) Applicant: PACTIV LLC, Lake Forest, IL (US)

(72) Inventors: Tom Van Nortwick, Lake Forest, IL (US); Jeff Hautzinger, Chicago, IL (US); Frank Petlak, Antioch, IL (US)

(73) Assignee: PACTIV LLC, Lake Forest, IL (US)

( * ) Notice: Subject to any disclaimer, the term of this patent is extended or adjusted under 35 U.S.C. 154(b) by 286 days.

(21) Appl. No.: 17/191,620

(22) Filed: Mar. 3, 2021

(65) Prior Publication Data

US 2022/0281631 A1      Sep. 8, 2022

(51) Int. Cl.
| | |
|---|---|
| *B65D 1/26* | (2006.01) |
| *B29C 51/26* | (2006.01) |
| *B29C 59/02* | (2006.01) |
| *B29D 22/00* | (2006.01) |
| *B65D 21/02* | (2006.01) |
| *B29C 51/08* | (2006.01) |
| *B29C 51/10* | (2006.01) |

(Continued)

(52) U.S. Cl.
CPC ............ *B65D 1/265* (2013.01); *B29C 51/266* (2013.01); *B29C 59/02* (2013.01); *B29D 22/003* (2013.01); *B65D 21/0233* (2013.01); *B29C 51/08* (2013.01); *B29C 51/10* (2013.01); *B29C 53/34* (2013.01); *B29K 2101/12* (2013.01)

(58) Field of Classification Search
CPC .................................................... B29C 51/266
See application file for complete search history.

(56) References Cited

U.S. PATENT DOCUMENTS

| | | | | |
|---|---|---|---|---|
| 3,182,841 A | * | 5/1965 | Searer | A61J 9/00 |
| | | | | 215/11.1 |
| 3,288,340 A | * | 11/1966 | Shapiro | B65D 1/265 |
| | | | | D11/143 |
| 3,349,950 A | | 10/1967 | Wanderer | |

(Continued)

FOREIGN PATENT DOCUMENTS

| | | | |
|---|---|---|---|
| CA | 2696182 | * | 9/2010 |
| EP | 3530581 A1 | † | 8/2019 |
| GB | 2 128 469 A | | 5/1984 |

OTHER PUBLICATIONS

Throne, James L., Understanding Thermoforming, Chapter 2, 17 pages, 19 (2d ed. 2008).†

(Continued)

*Primary Examiner* — Edmund H Lee
(74) *Attorney, Agent, or Firm* — Baker Botts L.L.P.

(57) ABSTRACT

Method of forming a container having a rolled rim, including providing a thermoformable sheet, and thermoforming the sheet to form a hollow body. The hollow body has an open first end and an opposite closed second end with a sidewall extending between the first end and the second end, and a rim structure formed at the first end of the hollow body. The rim structure includes an inner wall portion, a flange, and a skirt. The method further includes coining an upper section of the inner wall portion of the rim to form a controlled inner diameter, and rolling the rim structure to form a rigid rolled rim along an outer diameter of the open first end of the hollow body, the skirt extending toward the sidewall after being rolled.

10 Claims, 11 Drawing Sheets

(51) Int. Cl.
  *B29C 53/34*          (2006.01)
  *B29K 101/12*          (2006.01)

(56)          References Cited

U.S. PATENT DOCUMENTS

| | | | | | |
|---|---|---|---|---|---|
| 3,471,075 | A | * | 10/1969 | Wolf | B65D 1/265 |
| | | | | | D9/500 |
| 3,491,633 | A | * | 1/1970 | White | B65G 57/165 |
| | | | | | 83/155.1 |
| 3,784,052 | A | * | 1/1974 | Edwards | B65D 1/265 |
| | | | | | 206/520 |
| 3,947,205 | A | | 3/1976 | Edwards | |
| 4,052,037 | A | * | 10/1977 | Mair | B65D 1/265 |
| | | | | | 206/217 |
| 4,368,818 | A | | 1/1983 | Day et al. | |
| 4,578,296 | A | † | 3/1986 | Miyazaki | |
| 5,165,974 | A | † | 11/1992 | Odaka | |
| D495,199 | S | * | 8/2004 | Matthews | D7/396.4 |
| D619,852 | S | * | 7/2010 | Bodum | D7/532 |
| 8,393,886 | B2 | * | 3/2013 | D'Amato | B65D 3/22 |
| | | | | | 425/398 |
| 8,920,892 | B2 | | 12/2014 | Hernandez | |
| 10,477,998 | B2 | | 11/2019 | O'nan et al. | |
| 2002/0158370 | A1 | * | 10/2002 | Borst | B65D 1/26 |
| | | | | | 264/553 |
| 2005/0061821 | A1 | * | 3/2005 | Smith | B65D 1/46 |
| | | | | | 220/675 |
| 2006/0076395 | A1 | * | 4/2006 | Hayes | B65D 1/40 |
| | | | | | 229/400 |
| 2006/0226162 | A1 | | 10/2006 | Hayes et al. | |
| 2008/0099964 | A1 | * | 5/2008 | Guarriello | B29C 51/306 |
| | | | | | 264/544 |
| 2008/0263942 | A1 | * | 10/2008 | Hansen | B29C 51/325 |
| | | | | | 47/65.5 |

OTHER PUBLICATIONS

Throne, James L., Understanding Thermoforming, Chapter 6, 7 pages, 82 (2d ed. 2008).†

* cited by examiner
† cited by third party

103

112

118

7b

100

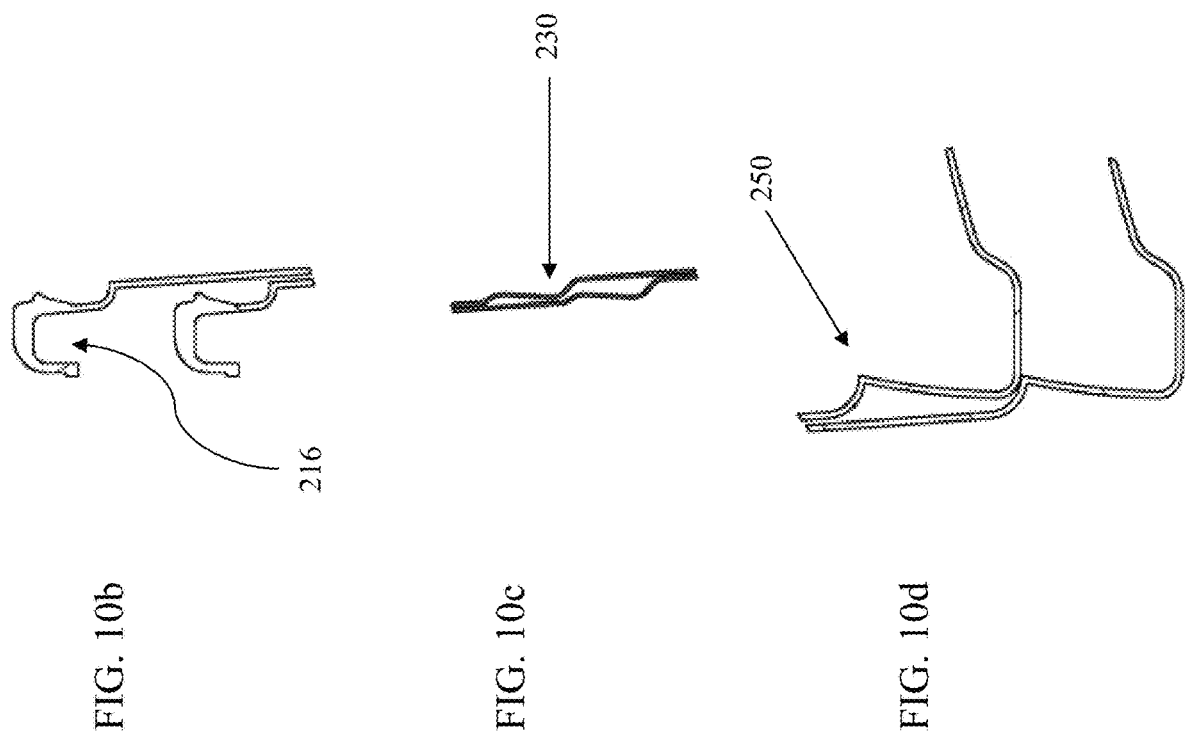
FIG. 10b
FIG. 10c
FIG. 10d
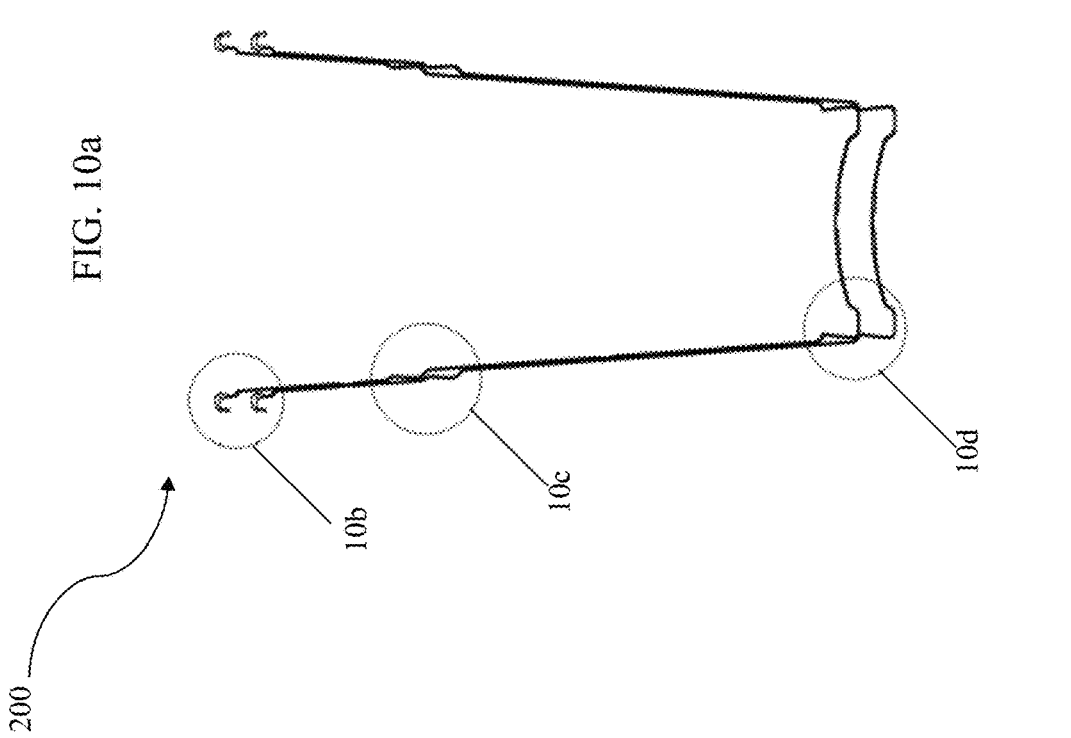
FIG. 10a

METHOD OF FORMING A CONTAINER HAVING A ROLLED RIM

BACKGROUND OF THE DISCLOSED SUBJECT MATTER

Field of the Disclosed Subject Matter

The disclosed subject matter relates generally to the field of thermoformed containers, specifically, the construction of a container such as a cup, bowl or the like. More specifically, the disclosed subject matter relates to a container having a rolled rim and a method of forming the same.

Description of the Related Art

A variety of thermoplastic containers, such as containers for food and beverages, are well known in the art. Such thermoplastic containers are relatively inexpensive and disposable; and therefore are extremely popular. Such containers are often used at parties, picnics, gatherings, and other occasions where minimal clean-up is desired.

Containers made of thermoplastic materials are particularly advantageous for both manufacturers and consumers. Such containers are generally more durable than paper containers, yet inexpensive, lightweight, and recyclable.

Thermoforming generally begins with a thin sheet or web of material such as polyethylene, polypropylene, polyester, or polystyrene having a thickness within a range of from approximately 8 mils to 100 mils, depending on the size of the container to be manufactured. Cups and similar articles are typically made from plastic sheet or web having a pre-thermoforming thickness from approximately 30 to 60 mils, but the finished articles may be thinner after thermoforming. The sheet or web is heated to a temperature suitable for thermoforming—such as, for example, in a range from approximately 110° C. to about 200° C. for the above-mentioned materials—and is thereafter fed into a conventional forming assembly in which the process proceeds under applied positive and/or negative air pressure conditions. Depending on the thermoforming process, whether melt phase or solid phase, oven temperatures can vary and can reach up to 485° C. in melt phase thermoforming. A mold cavity is used to impart a particular shape to define the thin-walled container as the plastic sheet or web is drawn into the mold using vacuum pressure on one side of the sheet or web and/or a positive pressure on the opposite surface of the sheet or web. A plug assist can be used to aid in the process of imparting a particular shape to define the thin-walled container. The container generally includes a sidewall, and may also be provided with a rim or lip along the mouth of the container. The shape of the container may be decorative, but generally has a particular utility—e.g., ribs for strength, texturing for grasping, and formations for nestability in addition to other utilities. The processing period for a normal thermoforming operation can be between 1 and 20 seconds.

One disadvantage of many existing thermoformed cup and container designs is the lack of structural integrity in the sidewall and the rim. Sidewalls and rims of thin-walled thermoformed containers often bend and deflect inward easily. A deflection of this sort can constrict the volume of the container and/or cause spillage and overflows. Additionally, deflection of the sidewall can make the container more difficult to grip, as well as potentially leading to cracking of the container sidewall.

An additional disadvantage of many existing cup and container designs is that if provided, the rim may have a squared-off edge. Such a rim is not preferable because the sharp edges of the squared-off edge may be uncomfortable to the touch and germs may collect under the rim when it is not completely rolled, rendering it unsanitary. Alternatively, rolled rim configurations eliminate the disadvantages of squared-off rims or flanges, as well as add rigidity to the overall rim. A rolled rim on a container can additionally improve the fit of a lid onto the container rim. A rolled rim with a controlled inside diameter, such as by coining an inner surface of the cup, can further improve the fit of a lid onto the cup rim.

A rolled rim can add significant rigidity to the rim as well as to close the space created at the rim. Such rolled rims have been created in containers formed of alkenyl aromatic polymeric materials such as polystyrene. There are numerous reasons, such as cost and consumer preference, to make consumer containers out of polymeric materials. However, polymeric materials become significantly softer than do alkenyl aromatic polymers during the thermoforming process. Due to the softness of polymeric material during thermoforming, such materials are not conducive to rim rolling processes. Thus, a need further exists for a container having a rolled rim that can be formed of a polymeric material.

The disclosed subject matter provides a solution to the recognized problems. The disclosed subject matter is intended to provide a container having a rolled rim made of polymeric material, and a method for forming the same.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

The disclosed subject matter includes a method for forming a container having a rolled rim, including providing a thermoformable sheet comprising a polymeric material, and thermoforming the sheet to form a hollow body. The hollow body has an open first end and an opposite closed second end with a sidewall extending between the first end and the second end, and a rim structure formed at the first end of the hollow body. The rim structure includes an inner wall portion extending upwardly from the sidewall, a flange extending outwardly from the inner wall portion, and a skirt extending downwardly from the flange. The flange defines a flange thickness and the skirt defining a skirt thickness, the flange thickness being greater than the skirt thickness. The method further includes coining an upper section of the inner wall portion of the rim to form a controlled inside diameter at least to a depth "d" from a top surface of the flange along an inner diameter of the open first end of the hollow body. The method further includes rolling the rim structure to form a rigid rolled rim along an outer diameter of the open first end of the hollow body, the skirt extending toward the sidewall after being rolled.

The hollow body can be a single piece, and the second end can include a bottom wall. The skirt can have an upper portion proximate the flange and a lower portion opposite the upper portion. The skirt thickness can vary between the upper portion and the lower portion prior to being rolled. The skirt can extend downward from the flange at an angle of approximately 90 degrees from the flange prior to being rolled.

The flange can extend outward from the inner wall portion at an angle of approximately 90 degrees from the inner wall portion. The flange can have a width between an inner portion and the outer portion of approximately 0.090 to 0.140 inches. The flange can have an inner portion proximate the inner wall portion of the rim structure and an outer portion forming a joint with the upper portion of the skirt prior to being rolled. The joint can define a hinge point between the skirt and the flange. The joint can define a joint thickness, the joint thickness being less than the flange thickness. The depth "d" of the controlled inside diameter is at least about 0.050 inches from the top surface of the flange.

The polymeric material can include at least one of polyethylene terephthalate (PET), polypropylene, high-density polyethylene, and blends thereof, and in particular, the thermoformable sheet can consist essentially of unfoamed polyolefin material. The polymeric material can include at least one filler or additive.

The disclosed subject matter also includes a method for forming a container having a rolled rim, including providing a thermoformable sheet comprising a polymeric material, and thermoforming the sheet to form a hollow body. The hollow body has an open first end and an opposite closed second end with a sidewall extending between the first end and the second end, and a rim structure formed at the first end of the hollow body. The rim structure includes an inner wall portion extending upwardly from the sidewall, a flange extending outwardly from the inner wall portion, and a skirt extending downwardly from the flange. The flange defines a flange thickness and the skirt defining a skirt thickness, the flange thickness being greater than the skirt thickness. The method further includes forming a controlled inside diameter in an upper section of the inner wall portion to a depth "d" from a top surface of the flange along an inner diameter of the open first end of the hollow body. The method can further include forming the controlled inside diameter by coining an upper section of the inner wall portion of the rim.

The disclosed subject matter also includes a method of forming a container having a rolled rim, including providing a thermoformable sheet comprising a polymeric material, and thermoforming the sheet to form a hollow body. The hollow body has an open first end and an opposite closed second end with a sidewall extending between the first end and the second end, and a strengthening rib on the sidewall. The strengthening rib is disposed closer to the first end than the second end, and has a first concave portion extending radially outwardly from an interior of the container and a first convex portion extending radially inwardly toward the interior of the container. The container has an overall height between the first end and the second end, and the strengthening rib is disposed approximately between ½ and ¾ the overall height from the second end.

The strengthening rib can have a "∠"-shape in side cross-section. The concave portion of the strengthening rib can be closer to the second end of the container than the convex portion of the strengthening rib. The concave portion of the strengthening rib can have a greater depth than the convex portion of the strengthening rib. The sidewall can have a bottom frustoconical portion below the strengthening rib and a top frustoconical portion above the strengthening rib, the bottom frustoconical portion defining a first taper line in side profile and the top portion defining a second taper line in side profile, wherein the first taper line is parallel to the second taper line. The first taper line can be offset from the second taper line by a taper line offset. The taper line offset can be approximately 0.080 to 0.100 inches.

The disclosed subject matter also includes a container having a rolled rim including a hollow body of a thermoformable sheet comprising a polymeric material. The hollow body has an open first end and an opposite closed second end with a sidewall extending between the first end and the second end, and a rim structure formed at the first end of the hollow body. The rim structure includes an inner wall portion extending upwardly from the sidewall, a flange extending outwardly from the inner wall portion, and a skirt extending downwardly from the flange and rolled towards the inner wall portion. The flange defines a flange thickness and the skirt defining a skirt thickness, the flange thickness being greater than the skirt thickness. The container further includes a controlled inside diameter on an upper section of the inner wall portion of the rim. The controlled inside diameter has a depth "d" from a top surface of the flange along an inner diameter of the open first end of the hollow body.

It is to be understood that both the foregoing general description and the following detailed description are exemplary and are intended to provide further explanation of the disclosed subject matter.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

FIG. 10*a* is a cross-sectional side view of a stacked arrangement of containers, in accordance with the disclosed subject matter.

FIG. 10*b* is a partial cross-sectional side view corresponding to the detail 10*b* of the stacked arrangement of containers shown in FIG. 10*a*.

FIG. 10*c* is a partial cross-sectional side view corresponding to the detail 10*c* of the stacked arrangement of containers shown in FIG. 10*a*.

FIG. 10*d* is a partial cross-sectional side view corresponding to the detail 10*d* of the stacked arrangement of containers shown in FIG. 10*a*.

DETAILED DESCRIPTION OF THE DISCLOSED SUBJECT MATTER

Reference will now be made in detail to the embodiments of the disclosed subject matter, an example of which is illustrated in the accompanying drawings.

Disclosed herein is a method for forming a container having a rolled rim, including providing a thermoformable sheet comprising a polymeric material, and thermoforming the sheet to form a hollow body. The hollow body has an open first end and an opposite closed second end with a sidewall extending between the first end and the second end, and a rim structure formed at the first end of the hollow body. The rim structure includes an inner wall portion extending upwardly from the sidewall, a flange extending outwardly from the inner wall portion, and a skirt extending downwardly from the flange. The flange defines a flange thickness and the skirt defining a skirt thickness, the flange thickness being greater than the skirt thickness. The method further includes coining an upper section of the inner wall portion of the rim to form a controlled inside diameter at least to a depth "d" from a top surface of the flange along an inner diameter of the open first end of the hollow body. The method further includes rolling the rim structure to form a rigid rolled rim along an outer diameter of the open first end of the hollow body, the skirt extending toward the sidewall after being rolled.

Figure 1:
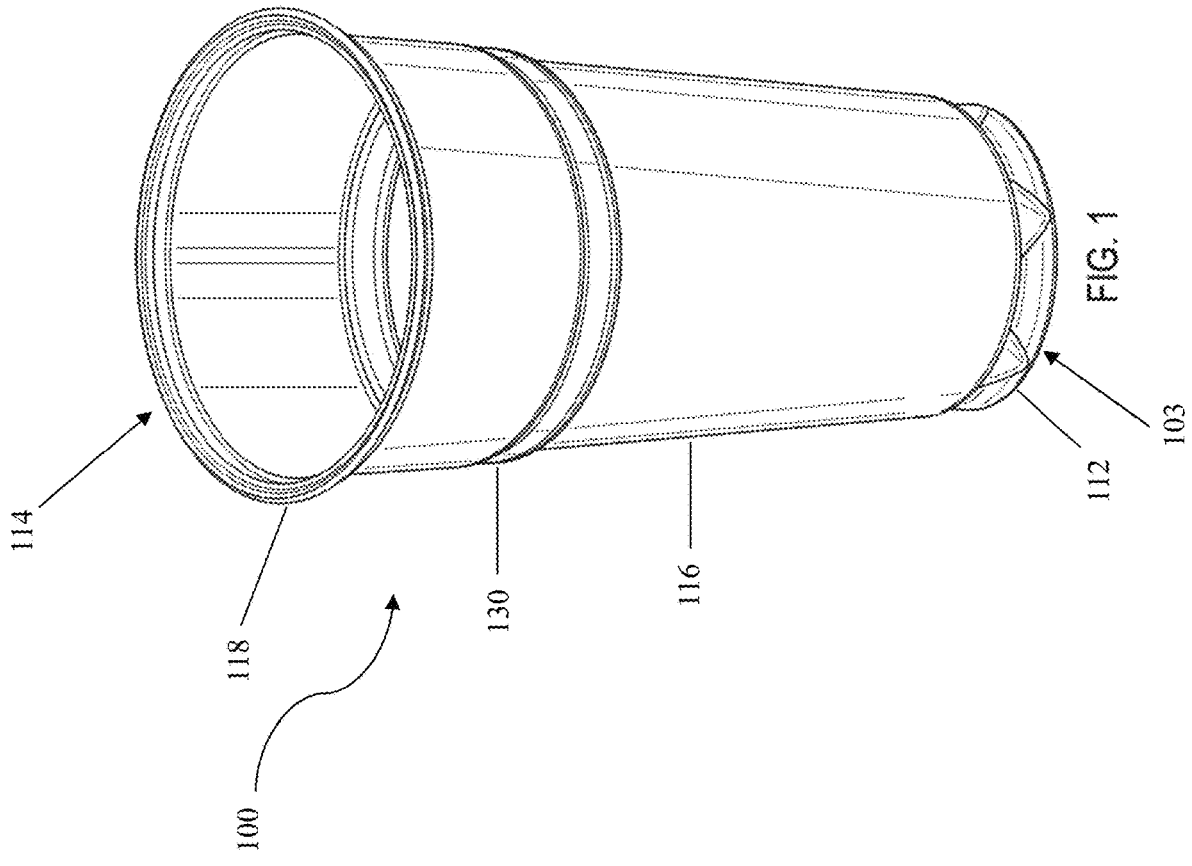
FIG. 1 is a perspective view of a container having a rolled rim according to an aspect of the disclosed subject matter.

For purpose of explanation and illustration, and not limitation, an exemplary cup having a rolled rim in accordance with the disclosed subject matter is shown in FIG. 1 as is designated by reference character 100. FIG. 1 shows a thermoformed cup in accordance with the disclosed subject matter. While the disclosed subject matter is particularly designed for use in thermoformed cups, other types of containers may also be capable of utilizing and benefiting from the disclosed subject matter. The disclosed subject matter can be used for a wide variety of containers, including but not limited to beverage cups, food containers, plates, and lids.

As embodied herein and depicted in FIG. 1, the container 100 has a bottom wall 112 defining a closed bottom 103. Container 100 has an open end or mouth 114 formed opposite the bottom wall 112. Container 100 includes a sidewall 116 extending from bottom wall 112 to mouth 114. The bottom wall 112 and sidewall 116 define a receptacle space capable of holding contents in the container 100.

The sidewall as embodied herein, is substantially cylindrical, and can be frustoconical, in shape, as shown generally in FIG. 1. However, the sidewall can have a variety of other shapes, including but not limited to rectangular, rounded, hexagonal, or octagonal polyhedronal shapes. In accordance with an aspect of the disclosed subject matter, as depicted in FIG. 1, the sidewall 116 has an upwardly and outwardly extending taper. Accordingly, the diameter of mouth 114 is greater than the diameter of bottom wall 112. Alternatively, however, the sidewall 116 can be configured such that the diameter of the mouth 114 can be substantially the same as that of bottom wall 112, if desired.

The dimensions of sidewall 116 depend on the particular application. For example and not limitation, if the container is a 30 ounce beverage cup, sidewall 116 can have a height approximately 7 inches, and a radius at the base of between 1 to 1.5 inches and a radius at the mouth of between 1.5 to 2.5 inches.

In accordance with an aspect of the disclosed subject matter, as shown in FIG. 1, the sidewall 116 can include at least one strengthening rib 130 disposed circumferentially about a surface of the sidewall 116, if desired. Additionally, a plurality of strengthening ribs 130 and other features or elements can be disposed circumferentially about the sidewall 116 of container 100 for a variety of functions, as disclosed in, for example, U.S. Patent Application Publication No. 2006/0226162, which is incorporated herein by reference.

Figure 2:
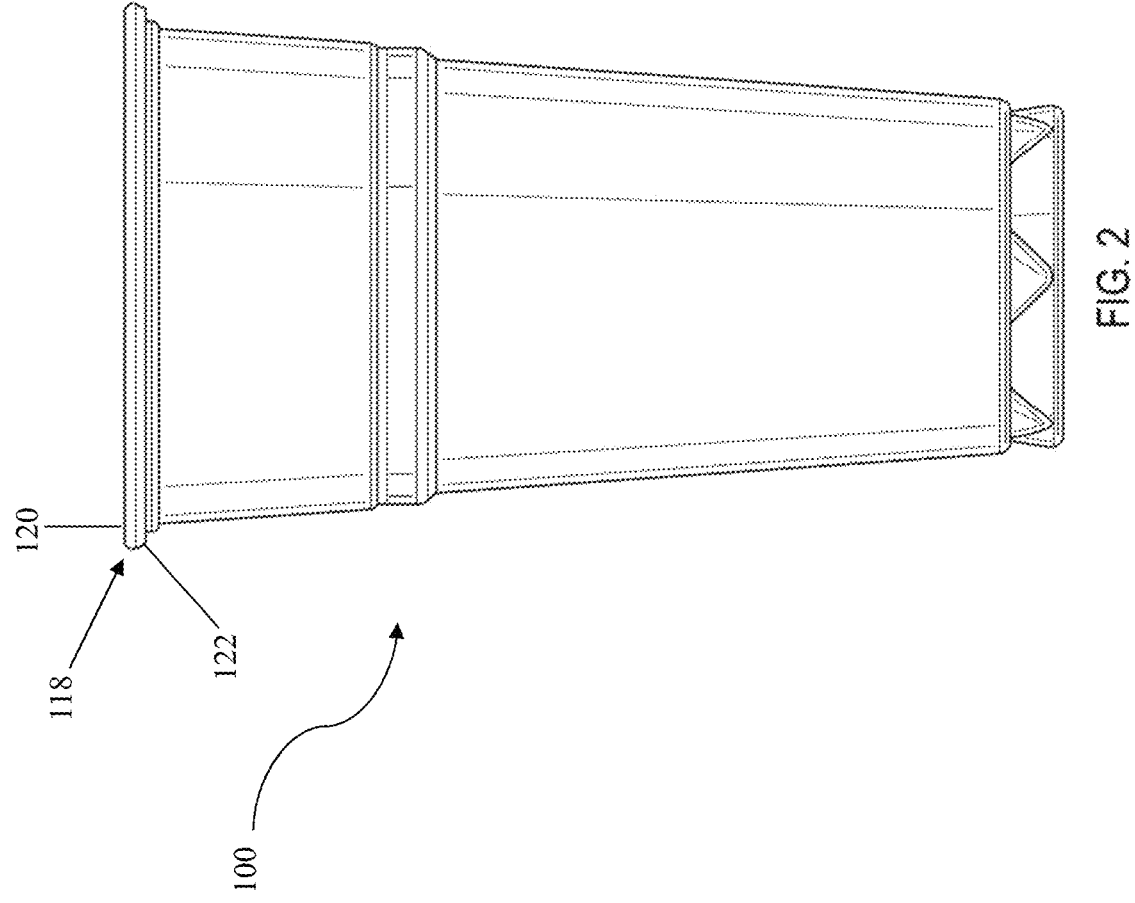
FIG. 2 is a front view of the container of FIG. 1. The rear view is identical.

In accordance with the disclosed subject matter, mouth 114 of container 100 includes an annular rolled rim 118. The rolled rim 118 can have a substantially planar top surface 120, and a rolled outer surface 122, as depicted in FIG. 2. The rolled outer surface 122 can be rolled at least partially under the substantially planar top surface 120. The configuration of the rolled rim 118 therefore can have a generally triangular configuration. Alternatively, the rolled rim can have a folded-over or generally parallel configuration. Conventional manufacturing equipment and methods can be used to roll the rim in a container, such as those disclosed in U.S. Pat. No. 3,947,205, which is incorporated herein by reference. However, the disclosed subject matter can be adapted to any number of rim rolling processes.

Figure 3:
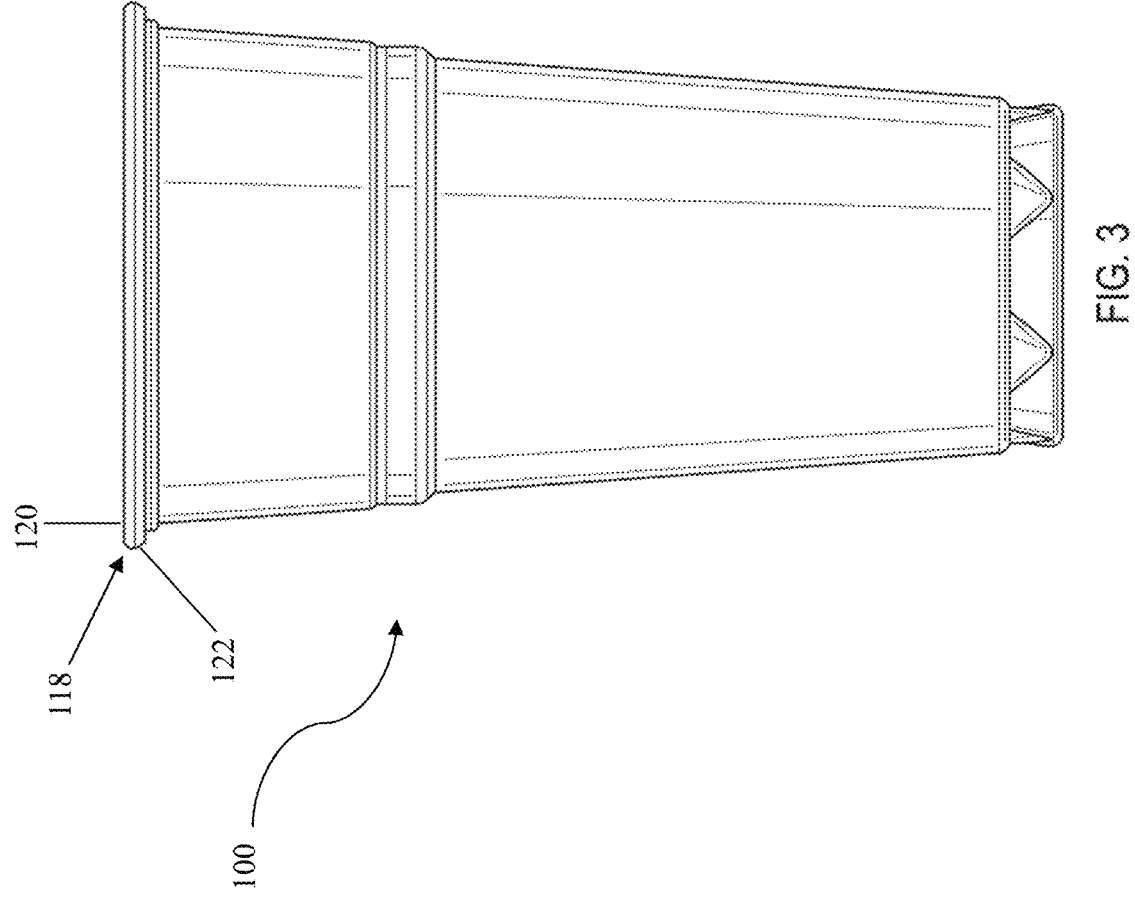
FIG. 3 is a right view of the container of FIG. 1. The left view is identical.
Figure 4:
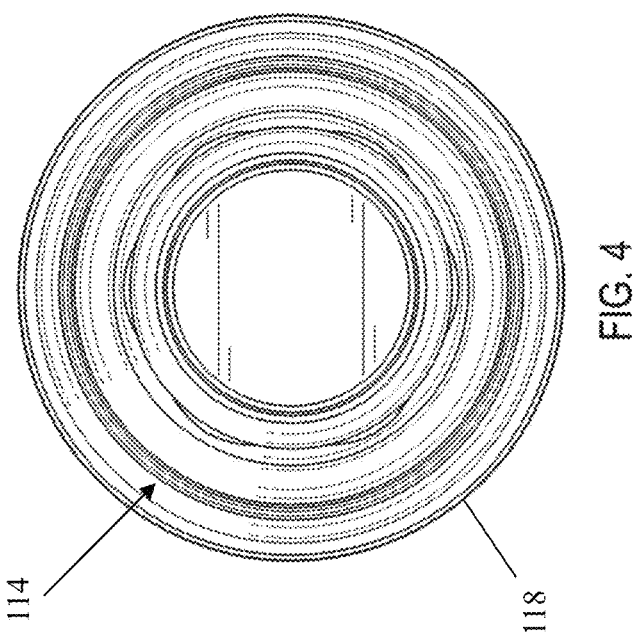
FIG. 4 is a top view of the container of FIG. 1.
Figure 5:
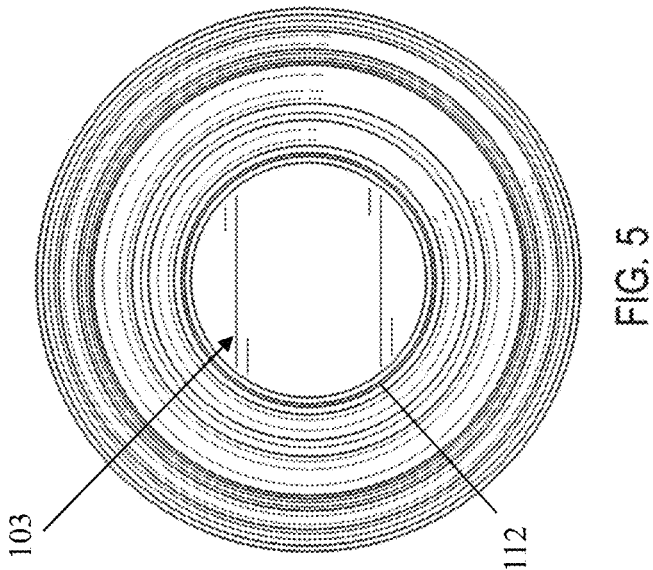
FIG. 5 is a bottom view of the container of FIG. 1.

For purpose of illustration, FIG. 3 depicts a right view of the container 100, FIG. 4 depicts a top view of the container 100, and FIG. 5 depicts a bottom view of the container 100.

Figure 6B:
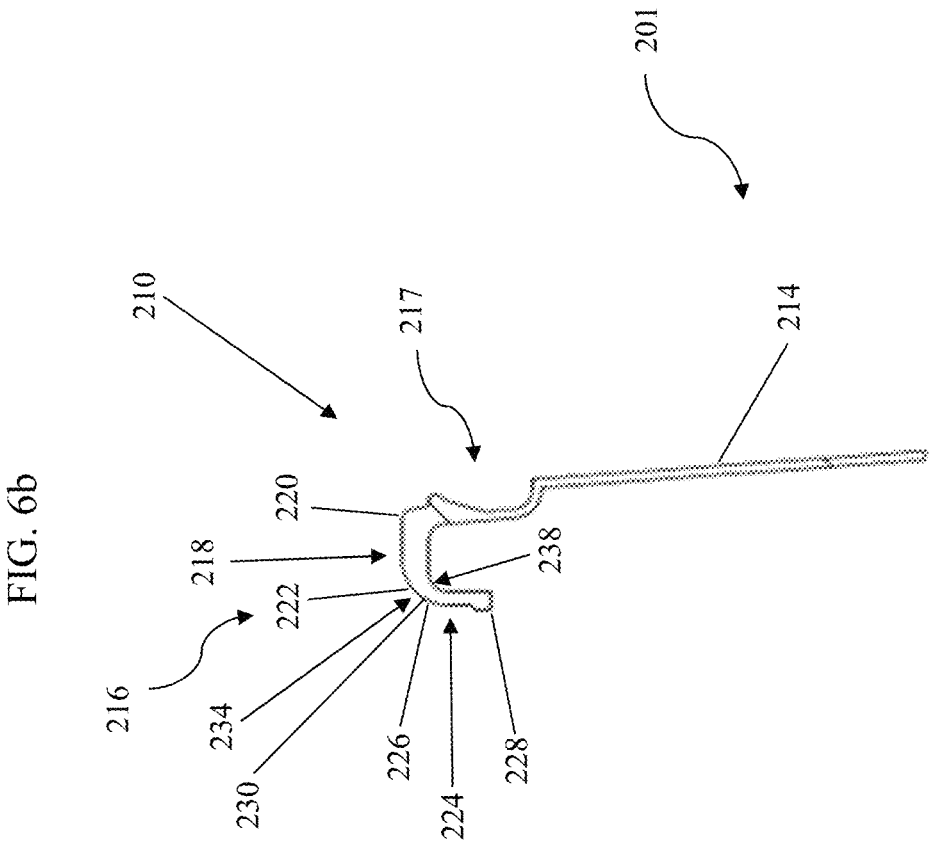
FIG. 6*b* is a partial cross-sectional side view of a first end of a container having an unrolled rim corresponding to the detail 6*b* of the container shown in FIG. 6*a*.

In accordance with the disclosed subject matter, a method for forming a container including a rolled rim and made of a polymeric is provided. For purposes of explanation and illustration, and not limitation, a cross-sectional side view of a container 200, which is container 100 prior to having the rim rolled, in accordance with the disclosed subject matter is depicted in FIGS. 6*a*-6*d*. Particularly, FIG. 6*b* shows a detailed view 6*b* at a first end of the container 200, such as at the upper end or mouth of a cup. FIGS. 6*c* and 6*d* show a partial cross-sectional side view of a first end of the container 200.

In order to create container 100 in accordance with the disclosed subject matter, a sheet of thermoformable polymeric material can be provided and thermoformed to create a hollow body 201, a portion of which is shown in FIG. 6*b*. A variety of systems and techniques are known to thermoform a sheet of polymeric material into the general configuration of a container. As shown in FIGS. 6*a*-6*d*, hollow body 201 includes an open first end 210 and an opposite second end 212, with a sidewall 214 extending between first end 210 and second end 212. Hollow body 201 includes a rim structure 216 formed at the first end 210 of the hollow body 201. As embodied herein, hollow body 201 preferably is a single piece and is closed at second end 212 to define a bottom wall. As further embodied herein, sidewall 214 can be approximately 0.007 to 0.020 inches thick, although any suitable thickness can be used.

In accordance with the disclosed subject matter, the container can be made of a polymeric material. Examples of suitable polymeric materials include, but are not limited to polyethylene terephthalate (PET), unfoamed polyolefin material, and polypropylene polymers, such as, for example polypropylene homopolymers, polypropylene random copolymers, or polypropylene impact polymers, ethylene polymers, such as, for example, high density polyethylene, medium density polyethylene, or low density polyethylene, and mixtures, copolymers, monolayer, laminated multilayer, or coextruded multilayer combinations thereof.

In order to create a polymeric container with a rolled rim, the disclosed subject matter provides a container 200 having a first end including rim structure 216. The rim structure 216 includes an inner wall portion 217 extending upwardly from the sidewall. The rim structure 216 also includes a flange 218 extending outwardly from the inner wall portion 217. The flange 218 is of a thickness and width sufficient for additional subsequent processing to roll the rim structure 216. The flange 218 has an inner portion 220 proximate the inner wall portion 217 of the rim structure 216, and an outer portion 222 opposite the inner portion 220. Rim structure 216 additionally includes a skirt 224 extending downwardly from the outer portion 222 of the flange 218. The skirt 224 has a skirt thickness and length sufficient for additional subsequent processing to roll the rim structure 216. The skirt 224 has an upper portion 226 proximate the flange 218 and a lower portion 228 opposite the upper portion 226.

In accordance with an aspect of the disclosed subject matter, the thickness of the flange 218 can be greater that the skirt thickness. For example, as embodied herein, the thickness of flange 218 can be at least about twice the skirt thickness. The greater thickness of flange 218 relative to the skirt thickness allows the rim to endure the heat or pressure applied during the rim rolling process. For purpose of illustration and not limitation, the thickness of flange 218 can be between 0.025 to 0.060 inches, and the skirt thickness can be between 0.025 to 0.040 inches, as embodied herein with reference to a 30 ounce cup. Additionally, and in accordance with an aspect of the disclosed subject matter, the flange can extend from the sidewall a relatively larger distance than conventional containers. For example, the flange 218 for a 30 ounce cup can have a width extending from inner portion 220 to outer portion 222 that is approximately 0.115 to 0.120 inches.

The skirt thickness can vary between the upper portion 226 and the lower portion 228, for example, prior to being rolled. For example, the skirt thickness can decrease from the upper portion 226 of the skirt 224 to the lower portion 228 of the skirt 224 to define a taper on the skirt 224. For example and not limitation, for a 30 ounce cup, the skirt 224 can have a length from upper portion 226 to lower portion 228 of approximately 0.080 to 0.150 inches, although other suitable dimensions can be used.

In accordance with another aspect of the disclosed subject matter, the flange 218 and the upper portion 226 of the skirt 224 form a joint 230 at an interface therebetween, as shown in FIG. 6b. The joint can define a hinge point between the skirt 224 and the flange 218. The joint 230 can include an upper surface having an outer radius 234 and a lower surface having an inner radius 238. In accordance with another aspect of the disclosed subject matter, the outer radius 234 is at least about twice the inner radius 238. As such, the joint 230 can have a joint thickness less than the thickness of flange 218.

Figure 6A:
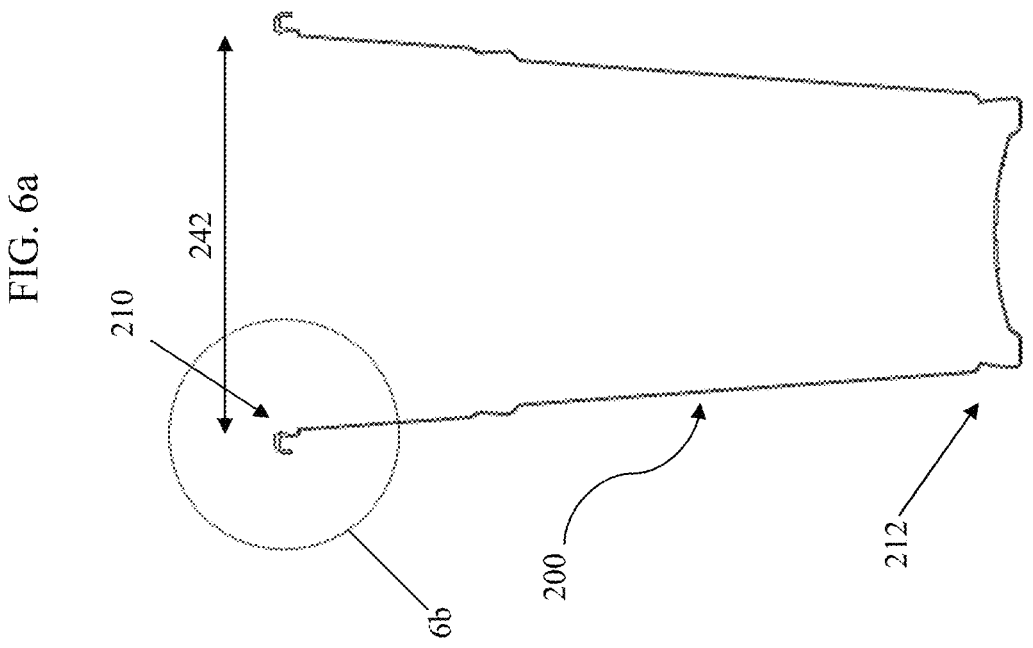
FIG. 6*a* is a cross-sectional side view of a container having a rolled rim, prior to having the rim rolled, in accordance with the disclosed subject matter.
Figure 6D:
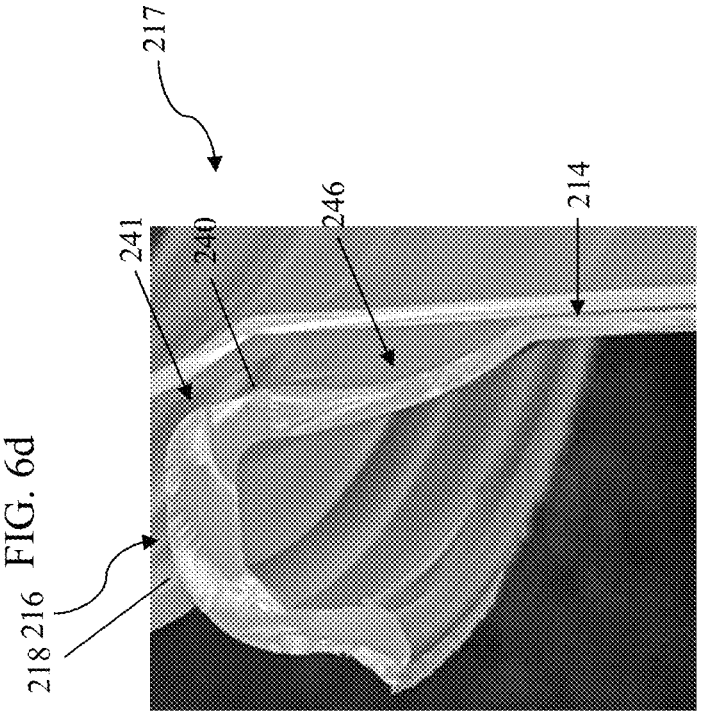
FIG. 6*d* is a partial cross-sectional side view of a first end of a container having an unrolled rim, in accordance with the disclosed subject matter.
Figure 6C:
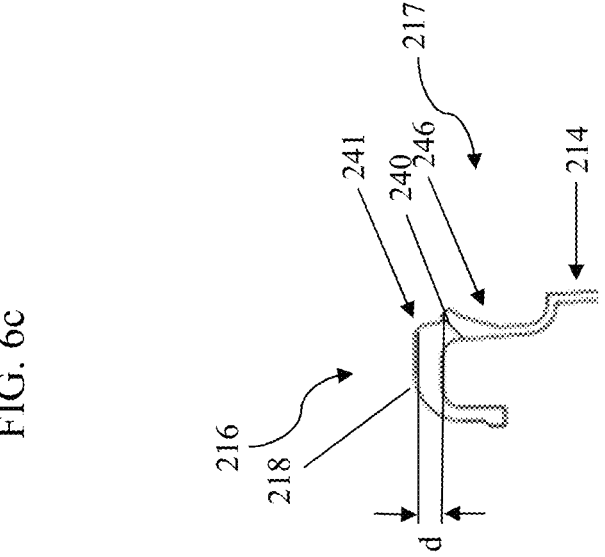
FIG. 6*c* is a partial cross-sectional side view of FIG. 6*b*.

As shown in FIGS. 6a and 6b, the flange 218 extends at an angle of approximately 90 degrees from the inner wall portion 217, and the skirt extends from flange 218 at an angle of approximately 90 degrees. However, the flange and skirt can extend at an angle other than 90 degrees depending upon the rolled rim configuration desired.

A container in accordance with the disclosed subject matter can be processed by conventional coining techniques to create a container with a controlled inside diameter 242, a coined ledge 240, and a deformed portion 246, as shown in FIGS. 6c and 6d, which depict a partial cross-sectional side view of FIG. 6b. Particularly, as shown in FIGS. 6a, 6c, and 6d, the coined ledge 240 is defined immediately below a vertical wall 241 and controlled inside diameter 242 of the inner wall portion 217 of the rim structure 216, where the controlled inside diameter 242 can be the distance between the vertical wall 241 of the inner wall portion 217 on one side of the container, across the interior of the cup, to the vertical wall 241 of the inner wall portion 217 on the opposite side of the container. The controlled inside diameter 242 has a depth "d" from a top surface of the flange 218 along an inner diameter of the open first end 210 of the hollow body 201. The controlled inside diameter 242 can have a depth "d" of least about 0.050 inches from the top surface of the flange 218. A deformed portion 246 can be defined on the inner wall portion 217 of the rim between the coined ledge 240 and the sidewall 214.

Figure 7B:
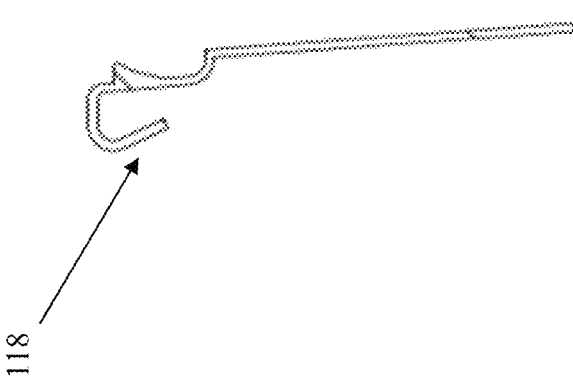
FIG. 7*b* is a partial cross-sectional side view of a first end of the container having a rolled rim corresponding to the detail 7*b* of the container shown in FIG. 7*a*.
Figure 7A:
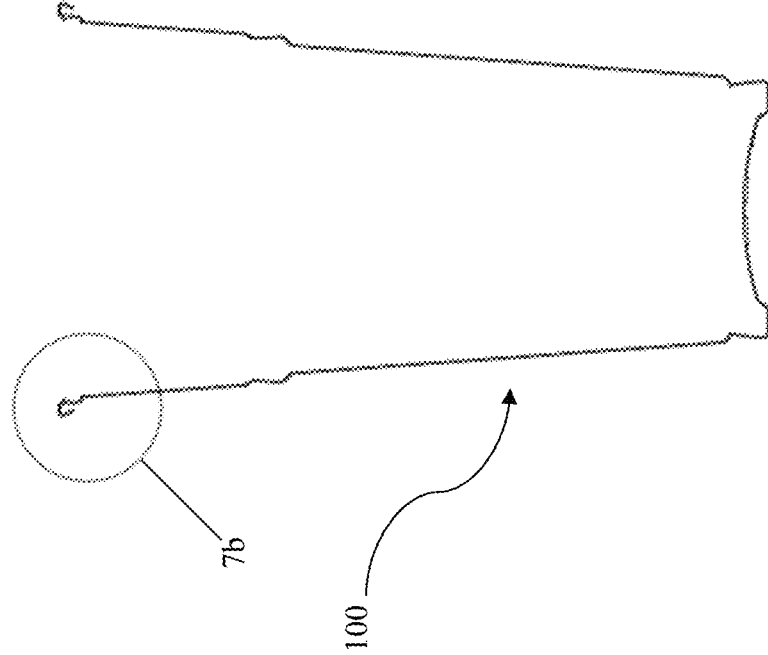
FIG. 7*a* is a cross-sectional side view of the container having a rolled rim, in accordance with the disclosed subject matter.

Container 200 in accordance with the disclosed subject matter can be processed by conventional rim rolling technique to create container 100 with rolled rim 118, as shown in FIGS. 1-5, 7a, and 7b. For purpose of illustration, FIG. 7a depicts a cross sectional view of container 100 in accordance with the disclosed subject matter. FIG. 7b shows a detailed view 7b at a first end of container 100 having rolled rim 118. The container of the disclosed subject matter has a geometry that allows such a container made of polymeric material to be processed by known rim rolling techniques as detailed below.

In accordance with an aspect of the disclosed subject matter, the rolled rim 118 of FIG. 1 can be formed of polymeric container by known rim rolling techniques. Such techniques are disclosed in U.S. Pat. No. 3,947,205, which is incorporated herein by reference. Generally, a stack of nested containers is fed into a conveyor, which directs the containers into a space between a set of rotating feed rollers. The feed rollers engage the rims of the containers and rotate the stack of nested containers. The containers are thereby advanced into the interior of a heated oven having a heating source, such as for example a calrod, or a convectional, radiant, or other heat source. The stack of nested containers is headed in the oven, and then are directed to a set of rotating forming screws. The forming screws engage the heated rims of the containers and progressively fold a portion of the rims inward and downward (i.e., towards sidewall 214) to create the rolled rim of each container.

Figure 8B:
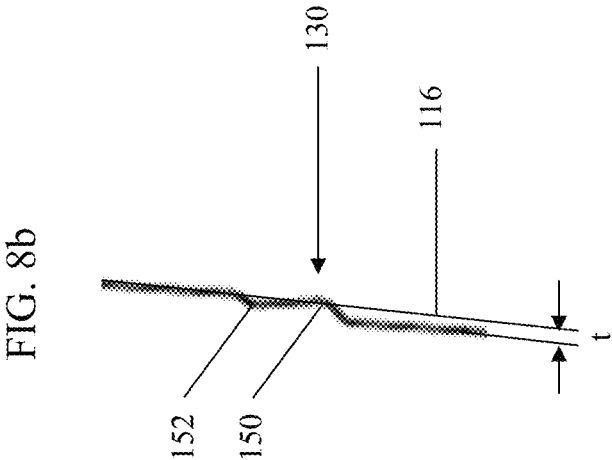
FIG. 8*b* is a partial cross-sectional side view of a strengthening rib of the container having a rolled rim corresponding to the detail 8*b* of the container shown in FIG. 8*a*.
Figure 8A:
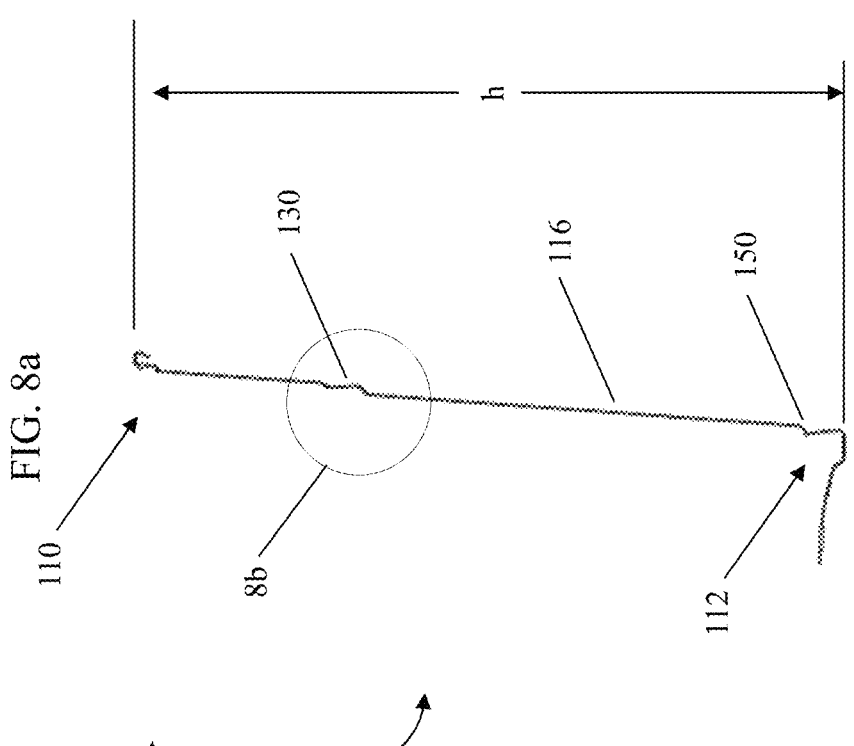
FIG. 8*a* is a partial cross-sectional side view of the container having a rolled rim, in accordance with the disclosed subject matter.

FIG. 8a depicts a partial cross-sectional view of container 100. FIG. 8b depicts a detailed view 8b of the container 100 shown in FIG. 8a. Hollow body 101 can have a strengthening rib 130 on sidewall 116. As shown in FIG. 8a, strengthening rib 130 can be disposed closer to a first end 110 of the hollow body 101 than a second end 112. The container 100 can have an overall height "h" between the first end 110 and the second end 112. The strengthening rib 130 can be disposed approximately between ½ and ¾ the overall height "h" of container 100. For example, the strengthening rib can be disposed approximately ⅓ the overall height of container 100. As shown in FIG. 8b, the strengthening rib 130 can have a first concave portion 150 extending radially outwardly from an interior of the container 100 and a first convex portion 152 extending radially inwardly toward the interior of the container 100. The concave portion 150 can be closer to the second end 112 of the container 100 than the convex portion 152. The depth of the concave portion 150 of the strengthening rib 130 can be greater than the depth of the convex portion 152 of the strengthening rib 130. The strengthening rib 130 can have any suitable shape, including but not limited to a sawtooth wave, or a "L"-shape in side cross-section. The hollow body 101 can have also have a stacking feature 150 on the sidewall 116. The stacking feature 150 can be disposed at the second end 112.

The sidewall 116 can have a bottom frustoconical portion below the strengthening rib 130 and a top frustoconical portion above the strengthening rib 130, the bottom frusto-conical portion defining a first taper line in side profile and the top portion defining a second taper line in side profile, wherein the first taper line is parallel to the second taper line. The first taper line can be offset from the second taper line by a taper line offset "t". The taper line offset "t" can be approximately 0.080 to 0.100 inches, although other suitable dimensions can be used. The parallel taper lines can enable printing on an outer surface of the top frustoconical portion and an outer surface of the top frustoconical portion simultaneously and in a single pass.

Figure 9B:
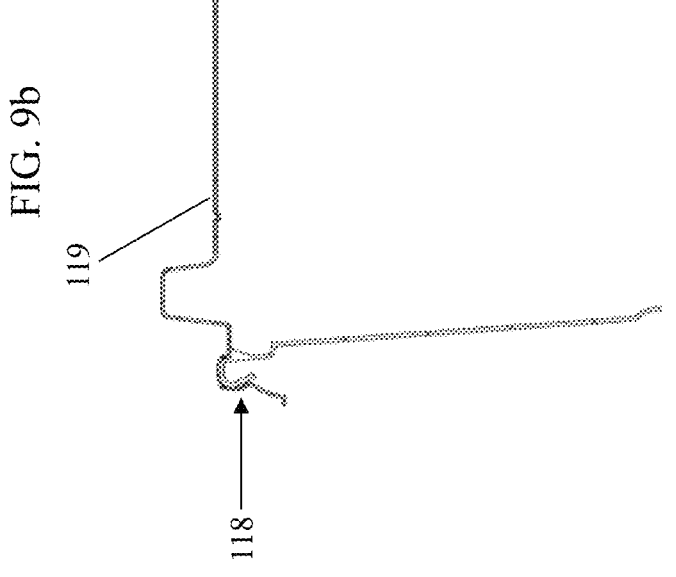
FIG. 9*b* is a partial cross-sectional side view of a first end of the container having a rolled rim shown in FIG. 9*a*.
Figure 9A:
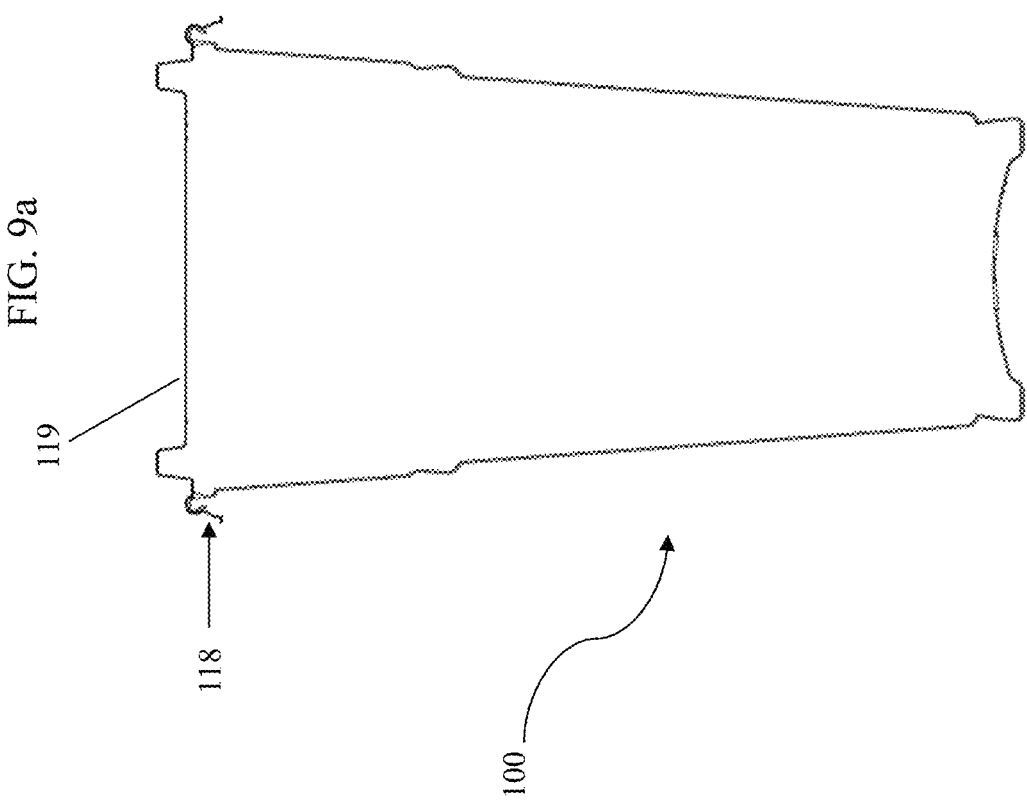
FIG. 9*a* is a cross-sectional side view of the container having a rolled rim and a lid, according to another aspect of the disclosed subject matter.

In accordance with another aspect of the disclosed subject matter, as shown in FIGS. 9a and 9b, a lid 119 can snap onto the rolled rim 118 of container 100. For purpose of illustration, FIG. 9a depicts a cross sectional view of container 100 with rolled rim 118 and lid 119. FIG. 9b shows a partial cross-sectional side view of container 100.

FIG. 10a depicts a stacked arrangement of containers 200. FIGS. 10b, 10c, and 10d show detailed views 10b, 10c, and 10d, respectively, of the stacked arrangement of the containers 200. As shown in FIG. 10b, rim structures 216 align vertically when two containers 200 are stacked. As shown in FIG. 10c, strengthening ribs 230 align when two containers 200 are stacked. As shown in FIG. 10d, stacking features 250 interlock when two containers 200 are stacked.

In accordance with another aspect of the disclosed subject matter, the polymeric material can include at least one filler and/or other additives. An exemplary type of additive that can be included in the polymeric material is a colorant. Such a colorant can be any suitable material capable of providing suitable color or hue, as well as white and black, to the material of the container. The colorants that can be used in the disclosed subject matter include, but at not limited to, pigments or dyes. The colorants may be used in a variety of modes, including but not limited to, dry color, conventional color concentrates, liquid color and precolored resin. The colorant can be provided in a sufficient concentration to provide the desired color. Other suitable fillers or additives include, but are not limited to talc, calcium carbonate, barium sulfate, wollastonite, mica, clay, kaolin or combinations thereof. For example, the polymeric material may comprise talc, calcium carbonate and polypropylene. A polymeric material comprising at least one particulate mineral filler and polypropylene is often more economical than the same non-filled neat polymeric material.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A method of forming a container having a rolled rim, comprising:

providing a thermoformable sheet comprising a polymeric material;

thermoforming the sheet to form a hollow body having an open first end and an opposite closed second end with a sidewall extending between the first end and the second end, and a strengthening rib on the sidewall, the strengthening rib disposed closer to the first end than the second end, the hollow body further having a rim structure formed at the first end of the hollow body, the rim structure including an inner wall portion extending upwardly from the sidewall, a flange extending outwardly from the inner wall portion, and a skirt extending downwardly from the flange;

coining an upper section of the inner wall portion of the rim structure to form a controlled inside diameter to a depth "d" from a top surface of the flange along an inner diameter of the open first end of the hollow body; and rolling the rim structure to form a rigid rolled rim along an outer diameter of the open first end of the hollow body, wherein the skirt extends toward the sidewall after being rolled, the rolled rim and controlled inside diameter defining a lid-engaging surface;

wherein the strengthening rib has a first concave portion extending radially outwardly from an interior of the container and a first convex portion extending radially inwardly toward the interior of the container;

wherein the container has an overall height between the first end and the second end, and wherein the strengthening rib is disposed approximately between ½ and ¾ the overall height.

2. The method of claim 1, wherein the strengthening rib has a "∠"-shape in side cross-section.

3. The method of claim 1, wherein the concave portion of the strengthening rib is closer to the second end of the container than the convex portion of the strengthening rib.

4. The method of claim 1, wherein the concave portion of the strengthening rib has a greater depth than the convex portion of the strengthening rib.

5. The method of claim 1, wherein the sidewall has a bottom frustoconical portion below the strengthening rib and a top frustoconical portion above the strengthening rib, the bottom frustoconical portion defining a first taper line in side profile and the top portion defining a second taper line in side profile, wherein the first taper line is parallel to the second taper line.

6. The method of claim 5, wherein the first taper line is offset from the second taper line by a taper line offset.

7. The method of claim 6, wherein the taper line offset is approximately 0.080 to 0.100 inches.

8. The method of claim 1, wherein the flange defines a flange thickness and the skirt defines a skirt thickness, the flange thickness being greater than the skirt thickness.

9. The method of claim 5, wherein the parallel taper lines allow for printing on an outer surface of the top frustoconical portion and an outer surface of the top frustroconical portion simultaneously and in a single pass.

10. The method of claim 1, wherein coining an upper section of the inner wall portion of the rim structure forms a coined ledge at the depth "d" to define a portion of the lid engaging surface.

* * * * *